United States Patent
Herman et al.

(10) Patent No.: US 12,206,729 B2
(45) Date of Patent: Jan. 21, 2025

(54) PLATFORM-AGNOSTIC COMPUTE INSTANCE LAUNCHES

(71) Applicant: Oracle International Corporation, Redwood Shores, CA (US)

(72) Inventors: Jonathan Luke Herman, Seattle, WA (US); Art Plata, Kenmore, WA (US); Joshua Potter, Tarpon Springs, FL (US); John Matthew Mullins, Lexington, KY (US); Nathan Cook, Lexington, KY (US); Nathan Turner, Lexington, KY (US); Tianyi Wei, Bothell, WA (US); Amit Vasudevan, Seattle, WA (US); Haifeng Ren, Snoqualmie, WA (US); Harsh Verma, Seattle, WA (US); Jiafeng Yang, Seattle, WA (US); John David Martinez, Lexington, KY (US); Daniel Stuart Goldfein, Seattle, WA (US); Mahima Tomer, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/132,280

(22) Filed: Apr. 7, 2023

(65) Prior Publication Data
US 2024/0340336 A1    Oct. 10, 2024

(51) Int. Cl.
*H04L 67/10*    (2022.01)
*G06F 9/4401*    (2018.01)

(52) U.S. Cl.
CPC ............ *H04L 67/10* (2013.01); *G06F 9/4401* (2013.01)

(58) Field of Classification Search
CPC ....... H04L 43/16; H04L 65/612; H04L 67/10; H04L 47/50; G06F 16/9017; G06F 16/256
See application file for complete search history.

(56) References Cited

U.S. PATENT DOCUMENTS

| 10,979,534 | B1 * | 4/2021 | Parulkar | H04L 63/10 |
| 2014/0365626 | A1 * | 12/2014 | Radhakrishnan | G06F 9/45558 709/222 |

\* cited by examiner

*Primary Examiner* — Cheikh T Ndiaye
(74) *Attorney, Agent, or Firm* — Invoke

(57) ABSTRACT

A technique may include receiving, by a management service a plurality of instance configurations from a client device. The technique may then include receiving, by the management service, information identifying a launch request for a compute instance. The technique may include determining, by the management service, one or more candidate shapes for the compute instance based at least in part on the plurality of instance configurations. The technique may include selecting, by the management service and from the one or more candidate shapes, a launch shape for the compute instance and launching the compute instance using the launch shape. The technique may then include providing, the client device access to the compute instance, launched based on the launch shape.

20 Claims, 12 Drawing Sheets

PLATFORM-AGNOSTIC COMPUTE INSTANCE LAUNCHES

BACKGROUND OF THE INVENTION

A cloud services provider may allow customers to provision and/or manage compute instances in a cloud environment. The compute instances may be associated with physical computers ("bare metal") or virtual machines. The cloud services provider may have multiple different architectures available for customers to select from when launching a compute instance of a virtual machine. Some customers may prefer a certain architecture over another based on performance metrics or other decisions. Other customers may not be concerned with the architecture of a particular virtual machine. The cloud services provider may wish to balance the usage of virtual machines across its customer base.

SUMMARY

A method may include receiving, by a management service a plurality of instance configurations from a client device. The method may then include receiving, by the management service, information identifying a launch request for a compute instance. The method may include determining, by the management service, one or more candidate shapes for the compute instance based at least in part on the plurality of instance configurations. The method may include selecting, by the management service and from the one or more candidate shapes, a launch shape for the compute instance and launching the compute instance using the launch shape. The method may then include providing, the client device access to the compute instance, launched based on the launch shape.

In some embodiments, the method may further include storing, an association between the launch shape and the information identifying the launch request. The method may then include accounting, by the management service, for a launch of the compute instance based at least in part on the launch shape. Subsequent to accounting for the launch of the compute instance based on the launch shape, the method may include retrieving, by the management service and from the data store, the launch shape based on the stored association between the launch shape and the information identifying the launch request. Launching the compute instance using the launch shape may be based on the launch shape retrieved from the data store.

In some embodiments, the information identifying the launch request may be a launch identifier, the launch identifier stored by the management service for later use.

In some embodiments, the method may include determining whether the launch request references a single instance configuration. The launch request may include one or more image attributes based at least in part on the one or more candidate shapes and a workload. The image attributes may be used to select an image to be launched on the compute instance.

In some embodiments, selecting the launch shape may be based, at least in part, on an availability associated with a shape. The availability associated with the shape may include a total usage of compute instances associated with the shape, monitored by the management service. The availability associated with the shape may include a fragmentation associated with the shape. The information identifying a launch request may include a reference to an array, where the array references the plurality of instance configurations, and the candidate shapes are determined based on the plurality of instance configurations.

In some embodiments, the launch request does not reference the plurality of instance configurations. Determining the one or more candidate shapes may then include accessing, one or more prestored instance configurations associated with the client device and generated prior to receiving the launch request. The method may then include determining, by the management service, one or more shapes indicated by each of the one or more prestored instance configurations and selecting, the one or more shapes indicated by each of the one or more prestored instance configurations as the one or more candidate shapes.

A system may include one or more processors and one or more non-transitory computer-readable media including instructions that, when executed by the one or more processors, cause the system to perform operations. The operations may cause the system to receive, by a management service and from a client device, a plurality of instance configurations. The system may receive information identifying a launch request for a compute instance. The system may then determine, by the management service, one or more candidate shapes for the compute instance based plurality of instance configurations. The system may then select, by the management service and from the one or more candidate shapes, a launch shape for the compute instance and launch the compute instance using the launch shape. The system may then provide, by the management service and to the client device, access to the compute instance, launched based, at least in part, on the launch shape.

In some embodiments, the system may store, by the management service and in a data store, an association between the launch shape and the information identifying the launch request. The system may then account, by the management service, for a launch of the compute instance based at least in part on the launch shape. Subsequent to accounting for the launch of the compute instance based on the launch shape. The system may retrieve, by the management service and from the data store, the launch shape based on the stored association between the launch shape and the information identifying the launch request. Launching the compute instance using the launch shape may be based on the launch shape retrieved from the data store.

In some embodiments, the information identifying the launch request may be a launch identifier, the launch identifier stored by the management service for later use. In some embodiments, the system may determine whether the launch request references a single instance. The launch request may include one or more image attributes, the image attributes used to select an image to be launched on the compute instance.

A non-transitory computer-readable storage medium may store a set of instructions that cause a computer system to perform operations, receiving, by a management service a plurality of instance configurations from a client device. The operations may then include receiving, by the management service, information identifying a launch request for a compute instance. The operations may include determining, by the management service, one or more candidate shapes for the compute instance based at least in part on the plurality of instance configurations. The operations may include selecting, by the management service and from the one or more candidate shapes, a launch shape for the compute instance and launching the compute instance using the launch shape. The operations may then include providing, the client device access to the compute instance, launched based on the launch shape.

In some embodiments, the operations may include storing, by the management service and in a data store, an association between the launch shape and the information identifying the launch request. The operations may include accounting, by the management service, for a launch of the compute instance based at least in part on the launch shape. Subsequent to accounting for the launch of the compute instance based on the launch shape, the operations may include retrieving, by the management service and from the data store, the launch shape based on the stored association between the launch shape and the information identifying the launch request. Launching the compute instance using the launch shape may be based on the launch shape retrieved from the data store.

In some embodiments, the information identifying the launch request may be a launch identifier, the launch identifier stored by the management service for later use. The plurality of instance configurations may include at least one of an architecture or a number of cores.

DETAILED DESCRIPTION

Figure 1:
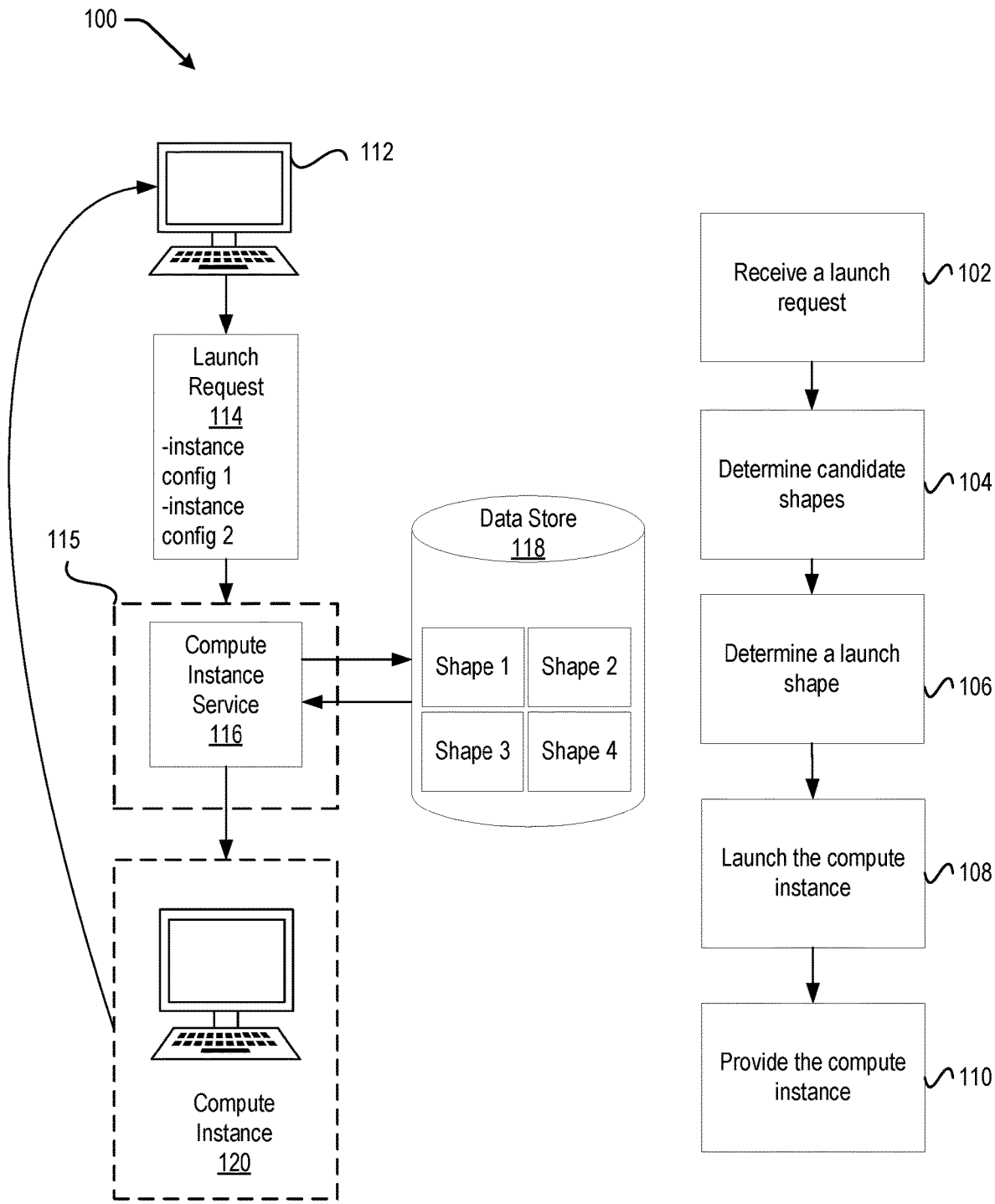
FIG. 1 illustrates a process for launching a platform-agnostic compute instance, according to certain embodiments.

A cloud services provider may allow customers to provision and/or manage virtual machines and bare-metal machines in a cloud environment. A compute instance may be an instantiation of a virtual machine and/or a bare-metal machine, having many of the same attributes that a physical computer may have. Like a physical computer, the compute instance may be associated with a shape. A shape may consist of configurable attributes such as a CPU type, number of processing cores, an amount of memory, and other such attributes. The CPU type may include other configurable attributes including architecture, vendor, and generation. In order to provide compute instances useable to a wide array of cloud services users, a cloud services provider may support launching virtual machines having several different arrangements of attributes and shapes.

The virtual machine may also be instantiated based on an image. The image may include a boot loader, an operating system, a file system, and other software to be used by the cloud services user. As the virtual machine may be just a compute instance, the operating system and other components of the image may need to be loaded onto the virtual machine every time the compute instance is created. Each component of the image may be associated with a certain shape. For example, the operating system included in the image may be configured to run on a specific processor architecture. Hence, a virtual machine with a certain shape including the specific processor architecture may be instantiated based on a virtual machine image that is associated with the certain shape.

In order to launch an appropriate compute instance of a virtual machine, a cloud services user may provide one or more instance configurations to the cloud services provider. The one or more instance configurations may be used to launch a compute instance (or a pool of compute instances) either at the time the instance configurations are created or at some later point. Each instance configuration may indicate the specific attributes and/or images for a compute instance desired by the cloud services user. A cloud services user's request to launch a compute instance may be associated with one or more instance configurations.

The cloud services user may not always require a compute instance to have a specific configuration of a compute instance; for example, the cloud services user may be platform-agnostic to the configuration of the compute instance, only requesting that a compute instance is launched using any of the configurations indicated in any of the instance configurations. In this situation, the cloud services provider may determine which of the instance configurations to use to provide the compute instances. This determination may be made based in part on several factors such as an availability of a given architecture, a cost, a projected usage, and other factors. For example, the cloud services provider may have an excess number of virtual machines of a certain architecture. The cloud services provider may then choose to provide a compute instance with the certain architecture, given that the certain architecture adheres to one of the instance configurations provided by the cloud services user. This may provide more consistent service to cloud services users by creating flexibility on the provisioning of compute instances. Other benefits may include increased operational efficiency of the cloud services provider. The techniques described herein may be used to allow a cloud services provider to launch and provide a compute instance to a platform-agnostic cloud services user.

FIG. 1 illustrates a process 100 for launching a platform-agnostic compute instance, according to certain embodiments. The process 100 may be performed on any or all of the systems disclosed herein. At step 102, the process 100 may include receiving a launch request 114 for a compute instance. The launch request may be sent by a cloud services user via a computing device such as the computing device 112. The launch request 114 may be received by a cloud services provider 115 and provided to a compute instance service 116. The cloud services provider 115 may provide one or more cloud subservices such as a shape selector service, a proxy service, one or more application programming interfaces (API), and other suitable services. In some embodiments, some or all of the cloud subservices may be included in the compute instance service 116. The compute instance service 116 may also provide the cloud services user with access to a compute instance of a virtual machine.

The launch request 114 may include any number of instance configurations that the compute instance service 116 can use to launch the compute instance. For example, the launch request may include any number of instance configurations (including possibly zero). Each instance configuration may include information indicating one or more or all attributes of a shape. A shape may consist of configurable attributes such as a CPU type, number of processing cores, an amount of memory, and other such attributes. The CPU type may include other configurable attributes including architecture, vendor, and generation. The instance configuration may also include image attributes associated with software to be loaded on a compute instance, virtual network interface card (VNIC) details, or other such information that may be required to launch a compute instance. For example, a first instance configuration may identify a first shape (e.g., shape A) defining an x86 architecture with four cores and 16 GB of memory. The first instance configuration may also include a first image attribute, to identify a particular operating system and set of applications or programs to be launched on the compute instance. A second instance configuration may identify a second shape (e.g., shape B) defining an ARM architecture with six cores and 32 GB of memory.

In either case, an instance configuration that specifies a particular architecture may be associated with an image including an operating system compatible with the instruction set necessary to run on the specified architecture. Each image may include the same workload, but configured to run on a specific architecture. The workload may include the same or similar software load (OS, applications, customer specific workloads, etc.). The cloud services user may provide one or more images, each associated with a specific architecture (e.g., ARM, x86). For example, if a first instance configuration specifies an x86 architecture, a first associated image may include a workload configured to run on the x86 architecture. A second instance configuration may specify an ARM architecture and a second associated image may include the same workload, but configured to run on the ARM architecture.

In some embodiments, the launch request may include an instance configuration identifier (ID). The instance configuration ID may reference a particular instance configuration (e.g., a predefined configuration) associated with the cloud services user. In some embodiments, the particular instance configuration may be included in an array (e.g., stored by the cloud services provider such as in the data store 118). The instance configuration ID may be used as a reference to the entry in the array. In other embodiments, the launch request may include multiple instance configurations, stored in an array.

Alternatively, the instance configuration ID may reference an array (or other data structure) storing multiple instance configurations. The instance configuration and/or array may be stored by the cloud services provider such as in the data store 118. In other embodiments, the launch request may include one or more instance configurations.

The preconfigured instance configurations may have some or all of the necessary information. The preconfigured instance configurations may be a standard or default configuration set by the cloud services user. For example, a stored instance configuration may only include an image attribute and a shape, which may not be enough information to deploy the instance. As such, when that is the case, the compute instance service 116 may request other important information from the user, or the user may provide it with the launch request. The other important information may include the VNIC details, an availability domain, or other relevant information. Alternatively, a stored instance configuration may only include certain attributes of a shape. For example, the stored instance configuration may include only architecture, but not number of cores. Any missing information may be provided with a launch request.

At step 104, the process 100 may include determining one or more candidate shapes. The one or more candidate shapes may be determined, at least in part, based on the launch request 114. In some embodiments, the candidate shapes may be determined based on compute instances previously launched for the cloud services user. For example, the cloud services user may have transmitted a previous request and been provided with a previous compute instance of shape C. Details such as the shape (e.g., shape C), image attribute, and availability domain, associated with the previous compute instance, may be stored by the compute instance service 116, along with a launch ID. The launch request 114 may then reference the launch ID, and a candidate shape may be determined using the details associated with the previous compute instance. In some embodiments, the candidate shapes may be determined based solely on the images provided. For example, a launch request may include and/or reference only one or more images without providing any other details. Each image may be based on the same workload, configured to run on a specific architecture and/or instruction set. The cloud services provider may then determine the candidate shapes based on the specific architectures required by each image. In some embodiments, machine learning and/or artificial intelligence techniques may be used to determine a candidate shape.

In determining the candidate shapes, the compute instance service 116 may access the data store 118. The data store 118 may include information associated with the cloud services user, such as limits on a number of compute instances the cloud services user may access at a given time. The limit may be determined by the cloud services user and/or the cloud services provider. The compute instance service 116 may verify that the instance configurations provided in the launch request 114 conform with the limits.

The data store 118 may also include information associated with one or more shapes able to be provided by the cloud services provider. For example, the cloud services provider may have multiple supported shapes, each with an associated availability. For example, a first shape (e.g., shape 1) may include an x86 architecture and have twelve cores available across two capacity objects, each capacity object with 32 GB of available memory. A capacity object may be a physical or logical object including one or more processing cores. Thus, the cloud services provider may be able to provide up to two compute instances that comply with the first instance configuration. A second shape (e.g., shape 2) may include an ARM architecture, also with twelve cores across two capacity objects, each capacity object with 32 GB of available memory. Thus, the cloud services provider may be able to provide up to two compute instances that comply with the first instance configuration. A third shape (e.g., shape 3) and a fourth shape (e.g., shape 4) may include architectures that are not compatible with the instance configurations provided in the launch request 114. In this example, the compute instance service 116 may therefore determine that shape 1 and shape 2 are candidate shapes.

At step 108, the compute instance service 116 may determine a launch shape from the candidate shapes. The compute instance service 116 may utilize a service such as a shape selector service. The shape selector service may be included in the compute instance service 116 and/or the compute instance service 116 may make a call to a third-party or external shape selector service (e.g., via an API). The compute instance service 116 and/or the shape selector service may take into account the availability of each of the candidate shapes via one or more cloud subservices of the cloud services provider 115. The availability may include determining a total usage by all cloud services users and/or capacity of the cloud services provider for each of the candidate shapes including fragmentation. To determine the availability and/or capacity of each candidate shape, the one or more cloud subservices of the cloud services provider 115 may monitor all compute instance provided to all cloud computing users, and store that information in a data store such as the data store 118.

The compute instance service 116 and/or the shape selector service may also take into account fragmentation of each candidate shape. For example, the first instance configuration may include a request for shape A (x86 architecture with four cores and 16 GB of memory). In some examples, shape 1 may include x86 architecture and a total of twelve cores across two capacity objects (e.g., each capacity object therefore has six cores available in theory). However, because the first instance configuration calls for four cores, only four of the six cores available on the capacity objects may be used to provide an instance. The remaining two cores on each capacity objects may be referred to as "fragmented." Therefore, the cloud services service may only provide two compute instances to the cloud services user that comply with the first instance configuration.

Similarly, because the second instance configuration may call for an ARM architecture with six cores, the compute instance service 116 may provide compute instances based on capacity objects with groups of at least six available cores. In some examples, shape 2 may include an ARM architecture with twelve cores across two capacity objects. Thus, each capacity object may have six cores available. There may be no fragmentation in this case. Therefore, the cloud services service may provide the cloud services user with two compute instances that comply with the second instance configuration.

Besides the availability of each of the candidate shapes, the shape selector may use other criteria for determining the launch shape. For example, each candidate shape may be weighted by the cloud services provider. The weighting may include a configurable float value or decimal (e.g., a number between 0 and 1). Each of the multiple supported shapes may be weighted based on a number of factors. These factors may include a popularity of a given shape, a testing need of a given shape, a contractual obligation, or other suitable factors. Each of these factors may have a weight associated with it, and the overall weighting of the shape may be an average of the weights of the different factors. The weights may be determined, at least in part, by artificial intelligence and/or by a user input. In some embodiments, the weights may be determined on a per-user basis.

At step 108, the compute instance service 116 may launch the compute instance 120. Launching the compute instance may include configuring one or more virtual machines according to the instance configurations in the launch request 114 and according to the launch shape determined by the compute instance service 116. For example, the launch shape may comply with at least one of the instance configurations provided in the launch request 114 and selected by the shape selector service. In some embodiments, the compute instance service 116 cloud services may store the launch shape with a launch identifier (ID). The launch ID may also be associated with the cloud services user, an image loaded on the compute instance, and/or other relevant information. The launch ID may be stored on the data store 118. At step 110, the compute instance service may provide the compute instance to the cloud services user.

Figure 2:
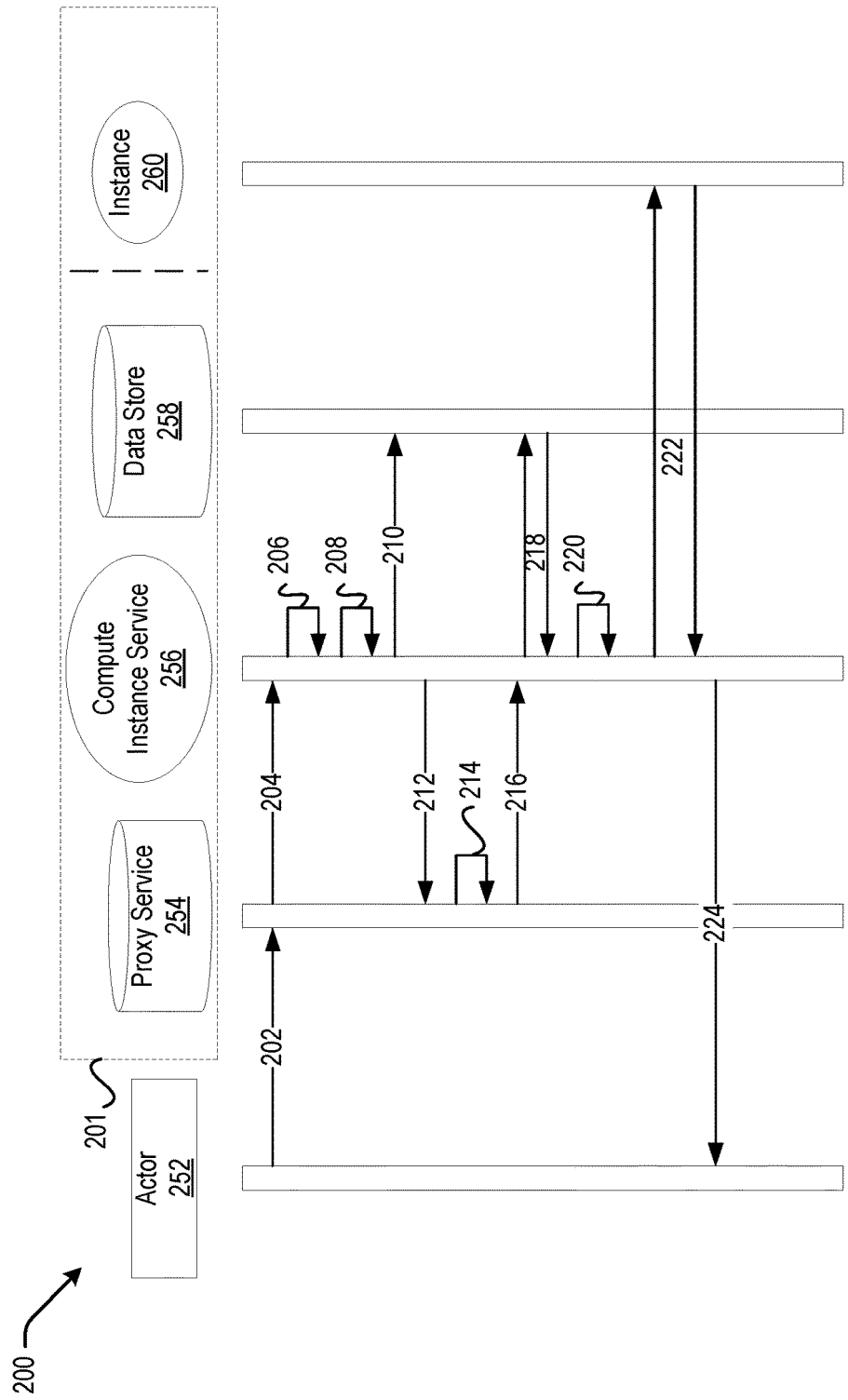
FIG. 2 illustrates a workflow of a process for providing a platform-agnostic compute instance service, according to certain embodiments.

FIG. 2 illustrates a workflow of a process 200 for providing a platform-agnostic compute instance service, according to certain embodiments. The process 200 may be performed by a management service 201 of a cloud services provider. The cloud services provider 215 may provide one or more compute instances to an actor 252 The actor 252 may be a cloud services user and/or an associated client device. To do so, the cloud services provider 551 may include a proxy service 254, a compute instance service 256, and a data store 258. Through the process 200, the management service 201 may create a compute instance 260. The process 200 may include all or some of the steps included in the process 100 described in FIG. 1.

The proxy service 254 may be a public facing endpoint of the cloud services provider, include a proxy data store, and perform one or more services for the cloud services provider. For example, the proxy service 254 may receive incoming traffic from one or more cloud services users (such as the actor 252) and route the incoming traffic to services provided by the cloud services provider. The services may include virtual cloud networking (VCN), compute instance management (such as the compute instance service 256), object storage, and other such cloud services.

The proxy service 254 may also track a current usage of one or more cloud resources provided to the actor 252 by the management service 201. The proxy service 254 may compare the current usage with one or more quotas or service limits associated with a cloud services user. For example, the cloud services user may be limited to a total usage of 100 processing cores. Thus, the cloud services user may have a service limit of 100 cores. A smaller subsection of the cloud services user (e.g., a business unit of a company) may be further restricted and be permitted to use five cores of the 100 cores allowed by the service limit. The five cores used by the smaller subsection may be referred to as a quota.

Furthermore, the cloud services user may have different service limits/quotas for different shapes/architectures. For example, the cloud services user may have a first service limit associated with shape A, and a second service limit of shape B. In some embodiments, information regarding the current usage of the cloud services user (e.g., usage vs service limits/quotas) may be stored on the proxy data store. Additionally or alternatively, the information may be stored elsewhere by the cloud services provider, such as the data store 258. The proxy service 254 may request the information and/or confirm the information stored at the proxy datastore by making API calls to the data store 258. Based on the information received, the proxy service 254 may update the proxy data store.

The compute instance service 256 may be similar to the compute instance service 116 in FIG. 1. As such, the compute instance service 256 may include one or more subservices, such as a shape selector as is described in FIGS. 5 and 6. In some embodiments, the one or more subservices may be included with the compute instance service 256. In other embodiments, the one or more subservices may be outside the compute instance service 256 and accessed through an API or other suitable means. The compute instance service 256 may also have an associated data store such as the data store 258. In some embodiments, the data store 258 is dedicated to the compute instance service 256. In other embodiments, the data store 258 may be shared with other services provided by the management service 201.

The data store 258 may store information associated with one or more cloud services users, such as the actor 252. The information may include service limits and/or quotas associated with the actor 252. The information may also include one or more instance configurations and associated instance configuration IDs. The one or more instance configurations may be stored on the data store 258 in an array, where the instance configuration IDs reference an entry in the array.

At step 202, the process 200 may include receiving an instance configuration and/or a launch request from the actor 252. The instance configuration and/or launch request may be received by the cloud services provider via the proxy service 254. The instance configuration may be received by itself, in advance of a launch request, or may be provided along with or as part of a launch request. The launch request may request a compute instance from the management service 201. The launch request may also reference one or more instance configuration IDs. The one or more instance configuration IDs may reference an array of instance configurations stored by the cloud services provider.

An instance configuration may include information indicating a shape, an image attribute, VNIC details, and other such information that may be required to launch a compute instance. In some embodiments, more than one instance configurations may be received at step 202. For example, the actor 252 may have multiple shapes, image attributes, etc. that would be acceptable in a compute instance. The actor 252 may not care which of the multiple shapes are used by the management service 201 to launch the compute instance. In other words, the actor 252 (and/or launch request) may be platform-agnostic. In other embodiments, the instance configuration and launch request may indicate multiple shapes that are desired by the actor 252.

At step 204, the proxy service 254 may transmit the shape(s) indicated in the instance configuration/launch request with the compute instance service 256. The proxy service 254 may include an ID associated with this request. The proxy service may attempt to verify a service limit and/or quota associated with the actor 252 and the shape(s) indicated in the instance configuration/launch request. At step 206, the compute instance service 256 may verify each of the service limits/quotas provided in the instance configuration/launch request. After verification, the shape(s) may be a candidate shape.

For example, the launch request may include two shapes. A first shape may include an ARM architecture with two cores and 10 instances. A second shape may include a x86 architecture with four cores and 8 instances. The compute instance service 256 may determine that the actor 252 has a service limit and quota of 10 instances for the first shape. The compute instance service may then determine that the actor 252 has a service limit and quota of five instances for the second shape. Because the requested number of compute instances of the second shape (10) exceeds the service limit and/or quota associated with the actor 252, the compute instance service 256 may determine that only the first shape is a candidate shape.

In another example, the instance configuration/launch request may indicate the same shapes as above, but the relevant service limits and quotas associated with the actor 252 may both exceed the number of compute instances requested (e.g., the service limits/quotas of both may be 12). The compute instance service 256 may determine that both the first shape and second shape are candidate shapes.

At step 208, the compute instance service 256 may select a launch shape from the candidate shapes. The selection of the launch shape may be performed by the shape selector service. The shape selector service may be included in the compute instance service 256 and/or the compute instance service 256 may make a call to a shape selector API. The compute instance service 256 and/or the shape selector service may take into account the availability of each of the candidate shapes, including fragmentation. Besides the availability of each of the candidate shapes, the shape selector may use other criteria for determining the launch shape. For example, each candidate shape may be weighted by the cloud services provider. The weighting may include a configurable float value or decimal (e.g., a number between 0 and 1). Each of the multiple supported shapes may be weighted based on a number of factors. These factors may include a popularity of a given shape, a testing need of a given shape, a contractual obligation, and other suitable factors. Each of these factors may have a weight associated with it, and the overall weighting of the shape may be an average of the weights of the different factors. The weights may be determined, at least in part, by artificial intelligence and/or by a user input. In some embodiments, the weights may be determined on a per-user basis.

Once the launch shape has been selected, at step 210, the compute instance service 256 may store the information associated with the launch shape at the data store 258. The compute instance service 256 may also store the ID with the request. Thus, the launch shape may be retrieved by looking up the ID request. The compute instance service 256 may also store the service limits and/or quotas associated with the actor 252 and the launch shape.

At step 212, the compute instance service 256 may transmit the service limits and quotas associated with the actor 252 and the launch shape to the proxy service 254. At step 214, the proxy service 254 may verify that the actor 252 has not reached the associated service limit and/or quota according to information stored at the proxy data store. For example, the launch shape may be the first shape (in this example, an ARM architecture with two cores and 10 instances). The proxy service 254 may then determine that the actor 252 is currently using five of the permitted ten compute instances of the first shape. Thus, the actor 252 would exceed their service limit and/or quota if the launch shape was provided. In this case, the request launch shape may not be provided to the actor 252 by the management service 201.

If the usage is below the associated service limits and quotas, the proxy service 254 may update the information stored on the proxy data store to reflect the current usage. For example, if at the time the proxy service 254 performed the verification, the actor 252 may have not been using any of the ten permitted compute instances. Thus, the proxy service 254 may then update the proxy data store to reflect a current usage of ten instances (per the instance configuration/launch request).

In response to determining that the actor 252 is within the service limits and/or quotas associated with the launch shape, at step 216 the proxy service 254 may transmit the launch request to the compute instance service 256. The launch request may indicate the launch shape and/or the ID associated with the launch request. At step 218, the compute instance service 256 may access the information associated the launch shape from the data store 258. The compute instance service 256 may utilize the ID associated with the launch request in order to access the information. At step 220, the compute instance service 256 may merge all information to launch a compute instance. Besides the architecture associated with the launch shape (e.g., x86, ARM, etc.), the merged information may also include any images used to configure the compute instance, an availability domain, VNIC details, and other such information that may be required to launch a compute instance. Some or all of this information may be stored on the data store 258 and/or provided along with the launch request.

At step 222, the compute instance service 256 may launch the compute instance 260. The compute instance may be based, at least in part, on the launch shape and/or the merged information. At step 224, the compute instance service 256 may provide the compute instance 260 to the actor 252.

In some embodiments, one or more instance configurations are provided with a launch request. However, to provide appropriate service levels, the process may vary for launch requests specifying a single instance configuration and those specifying multiple launch requests. For example, the process for a launch request received with just one instance configuration may indicate that only that instance configuration is acceptable for the cloud services user. The instance configuration may include a shape, image attribute, and other such information used to launch a compute instance. In this case, there may be no need for the cloud services provider to choose a shape (as only the instance configuration would be acceptable). If multiple instance configurations are indicated in the launch request, the process may be similar to the process 200 in FIG. 2. In either case, however, the shape(s), image attribute(s), and other information may be validated before a compute instance is provided. This may provide more consistent service to cloud services users by creating flexibility on the provisioning of compute instances. Other benefits may include increased operational efficiency of the cloud services provider.

Figure 3:
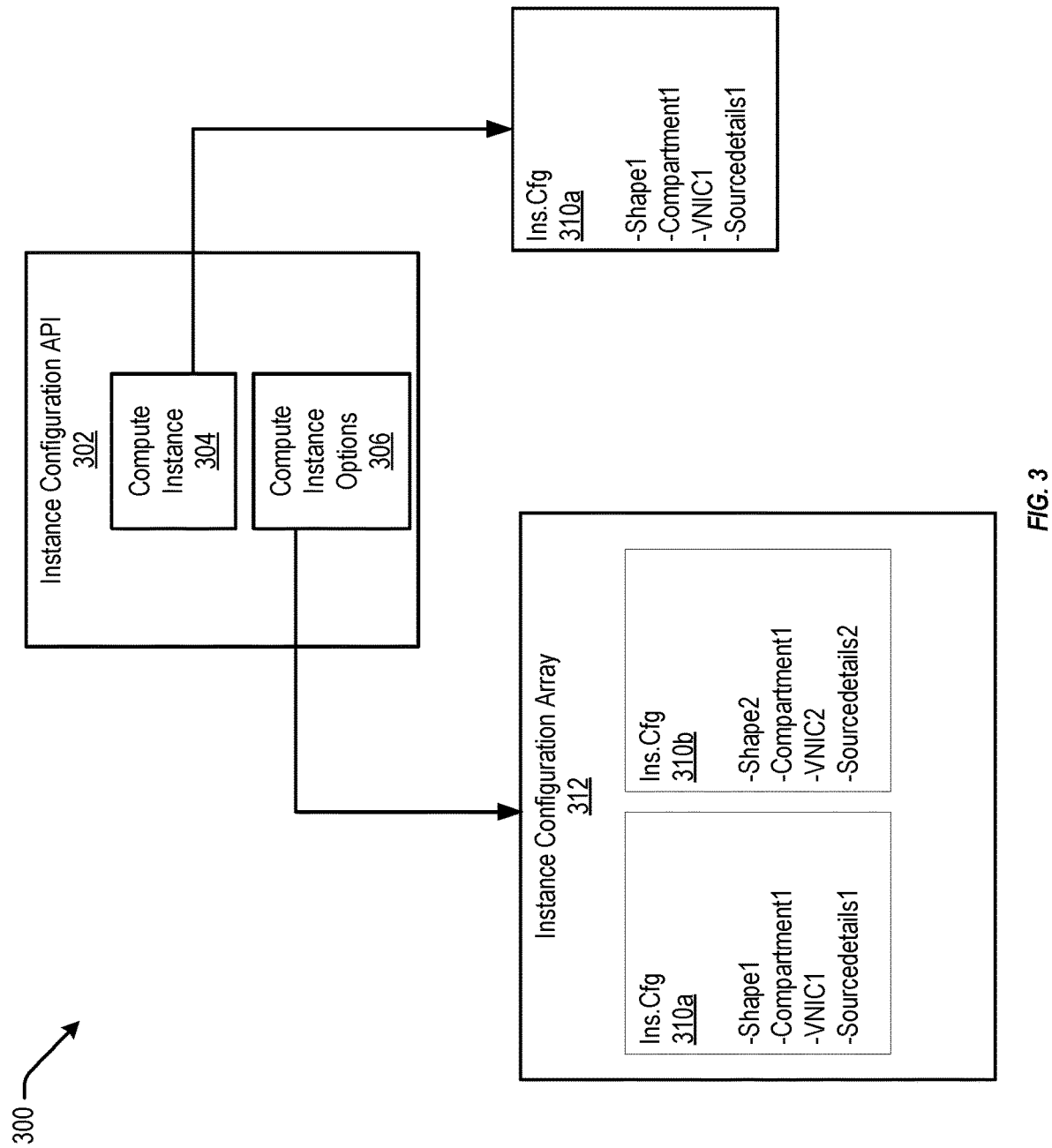
FIG. 3 illustrates a representation of an application programming interface for creating instance configurations, according to certain embodiments.

FIG. 3 illustrates a representation of an application programming interface (API) 300 for creating instance configurations, according to certain embodiments. The process 300 may be performed in addition to or as a part of the process 200 as described in FIG. 2. For example, the process 300 may be performed before any of the steps of the process 200 or may be performed as part of the step 202. The process 300 may be performed by a cloud services user, such as the actor 252 in FIG. 2.

The cloud services user may access an instance configuration API 302. (the "API") The API 302 may provide a means for the cloud services user to input one or more instance configuration options (and instance configurations) into a computing device for use in launching a compute instance. The cloud services user may create an instance configuration 310a using a compute instance function 304. The compute instance function 304 may be used to create a single instance configuration at or before a launch time at which the compute instance is launched.

The instance configuration 310a may indicate one or more details about a compute instance. For example, the instance configuration 310a may indicate a shape (e.g., shape 1), a compartment (e.g., compartment 1), a VNIC (e.g., VNIC 1), and source details (e.g., source details 1). The one or more details may correspond to a specific configuration supported by the cloud services provider. For example, the shape 1 may correspond to an ARM architecture. The source details 1 may correspond to an image of software configured to run on the architecture indicated by the shape 1.

The instance configuration 310a may also include a first instance configuration ID. The instance configuration 310a may be stored by the cloud services provider and accessed at some point later to launch a compute instance. The instance configuration 310a may be stored in an array, where the first instance configuration ID is used to reference the instance configuration 310a in the array. Alternatively, the first instance configuration ID may reference an array of instance configurations stored by the cloud services provider.

Alternatively or additionally, the cloud services user may create multiple instance configurations through the API 302 using the compute instance options function 306. Although the compute instance function 304 and the compute instance options function 306 are shown as individual functions, they may be the same function.

The cloud services user may create the instance configuration 310a using the compute instance options function 306. The cloud services user may then choose to create a different instance configuration with different details. The details may be different in order to choose a different testing or operational platform or may denote a different compute instance arrangement that would meet the cloud services user's needs. Thus, the cloud services user may create the instance configuration 310b using the compute instance options function 306.

The instance configuration 310b may indicate a shape (e.g., shape 2), a compartment (e.g., compartment 1), a VNIC (e.g., VNIC 1), and source details (e.g., source details 2). These details may correspond to a specific offering supported by the cloud services provider. For example, the shape 2 may correspond to an x86 architecture. The source details 2 may correspond to an image including the same software as the source details 1 but configured to run on the architecture indicated by the shape 2.

The instance configuration 310b may also include a second instance configuration ID. The instance configurations 310a and 310b may be stored by the cloud services provider and accessed at some point later to launch a compute instance. The instance configurations 310a-b may be referenced in an instance configuration array 312. where the first instance configuration ID is used to reference the instance configuration 310a and the second instance configuration ID is used to reference the instance configuration 310b. In some embodiments, the cloud services user may reference the instance configuration array 312 with a single instance configuration ID. In that case, the cloud services user may be agnostic as to the shape used to launch a compute instance. In some embodiments, a reference to the instance configuration array 312 may be transmitted to the cloud services provider with a launch request, such as the launch request 114 in FIG. 1.

Multiple instance configurations or references thereto may be stored in the array and used to populate a pool of compute instances. For example, the cloud services user may initially request five compute instances with the shape 1. At some point later, the cloud services user may request an additional five compute instances. However, the cloud services user may have no preference regarding the shape for the additional five compute instances. Instead, the cloud services user may provide information corresponding to an image to be used for the additional five compute instances. The cloud services provider may then access the instance configuration array 312 and select an instance configuration for the additional five compute instances. In this example, the cloud services provider may select the instance configuration 310b. This decision may be made by a shape selector, such as is described in FIG. 2. The pool of compute instances may therefore be populated with compute instances according to multiple instance configurations, configured by the cloud services user and selected by the cloud services provider.

Figure 4:
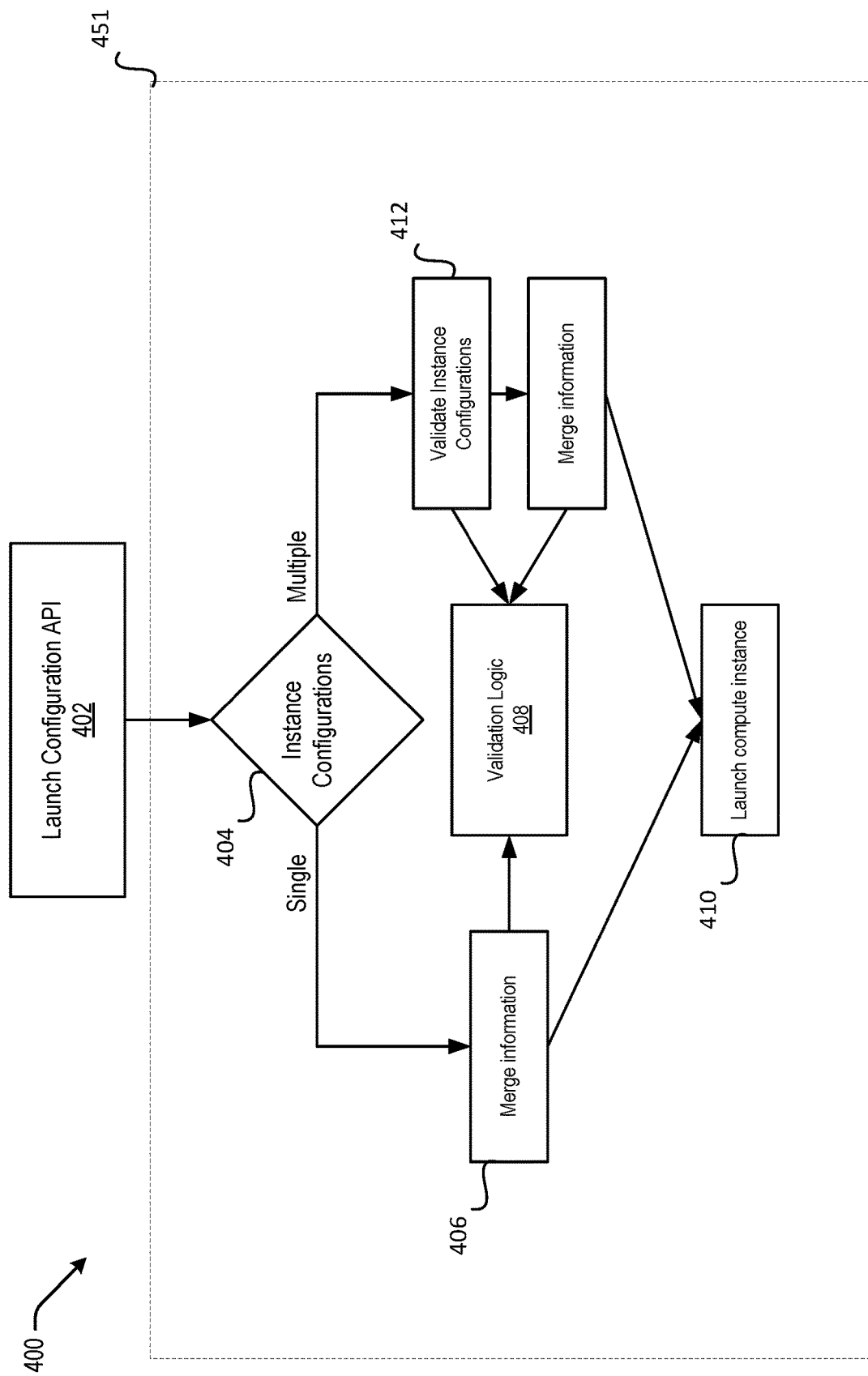
FIG. 4 illustrates a workflow of a process for validating instance configurations, according to certain embodiments.

FIG. 4 illustrates a workflow of a process 400 for validating instance configurations, according to certain embodiments. The process 400 may be performed instead of or in addition to the process 200 in FIG. 2. For example, the process 400 may be performed in addition to or instead of steps 204 to 214. As such, the process 400 may be performed by some or all of the systems included in a cloud services provider 451.

A launch configuration API 402 (the "API") may be accessed by a cloud services user via a computing device. The API 402 may include some or all of the functions of the API 302 in FIG. 3. The API 402 may be accessed at a launch time, when the cloud services user wishes to launch a compute instance. The API 402 may therefore generate a launch request, similar to the launch request 114 in FIG. 1. The API 402 may also provide one or more options to configure a compute instance, to be provided by the cloud services provider 451. For example, the API 402 may provide options to define one or more shapes. The options may include an architecture (e.g., x86, ARM, etc.), a memory volume (e.g., 16 GB, 42 GB etc.), a number of processing cores, and other relevant information used to create a shape for a compute instance. The API may also provide options to define other aspects of a compute instance. For example, the other aspects may include an image of an operating system or other application (e.g., Windows, Linux, etc.), a subnet, an availability domain, source details, VNIC information, and other relevant information. In some embodiments, the API 402 may provide options for the cloud services user to input an instance configuration ID. The instance configuration ID may be used to access previously stored instance configurations. Additionally or alternatively, the instance configuration ID may reference an array of instance configurations stored by the cloud services provider.

Once the cloud services user has created the one or more instance configurations, the API 402 may transmit the launch request and instance configurations to the cloud services provider 451. At block 404, the cloud services provider 451 may determine whether the launch request includes a single instance configuration or multiple instance configurations. The determination may be made by a service such as the proxy service 254 described in FIG. 2. The single instance configuration and/or multiple instance configurations may be represented by a respective instance configuration ID.

If the cloud services provider 451 determines that the launch request includes a single instance configuration (or instance configuration ID), at block 406, the cloud services provider 451 may merge information used to launch a compute instance. The information may include a shape, an image attribute and other such information. In some embodiments, the launch request may not provide all of the information needed to launch a compute instance. For example, the launch request may provide information indicating a shape and information associated with an image attribute. In merging the information, the cloud services provider 451 may then utilize one or more services to determine the other information needed to launch a compute instance. One of these services may include an image selector. The image selector may determine an image to be loaded on the compute instance using one or more tags provided by the cloud services user. The image selector may also determine an image to be loaded based, at least in part, on the shape indicated in the launch request. Each image may be based on the same workload, configured to run on the specific architecture defined within the shape.

Once the information has been merged, the cloud services provider 451 may validate the merged information using a validation logic 408. The validation logic 408 may be performed by services such as the proxy service 254 and/or the compute instance service 256 in FIG. 2. The validation may include accessing associated service limits and/or quotas and verifying the associated service limits and/or quotas against a current usage. The associated service limits and/or quotas and the current usage may also be associated with a particular shape.

The validation may also include ensuring a compatibility between the shape indicated in the instance configuration and the other information provided. For example, the shape indicated may include an x86 architecture and an image attribute corresponding to Oracle Linux 8. The validation may ensure that the latest version of the image is loaded and/or ensure compatibility between the indicated image and indicated shape.

After the information has been merged and validated, at block 410, the cloud services provider 451 may then launch the compute instance. Launching the compute instance may include steps 216-224 in FIG. 2. Thus, launching the compute instance may be performed by one or more services of the cloud services provider 451 such as the proxy service 254, the compute instance service 256, and other such services.

If the cloud services provider 451 determines that the launch request includes multiple instance configurations (or instance configuration IDs), at block 412, the cloud services provider 451 may validate the instance configurations. Validating the instance configurations may be performed before merging the information (such as at block 406) because a shape may not be determined yet. To determine the shape, the cloud services provider may utilize the validation logic 408. The validation logic 408 may be performed by services such as the proxy service 254 and/or the compute instance service 256 in FIG. 2. The validation may include accessing associated service limits and/or quotas and verifying the associated service limits and/or quotas against the current usage. The associated service limits and/or quotas and the current usage may also be associated with each particular shape included in the launch request. The particular shapes that do not exceed the service limits and/or quotas may then be candidate shapes.

The validation may also include selecting a launch shape from the candidate shapes, The selection may be performed by a shape selector service. The shape selector service may be included in one or more service such as the compute instance service 256. The compute instance service and/or the shape selector service may consider the availability of each of the candidate shapes, including fragmentation. The availability of each candidate shape may include a total usage of virtual machines associated with each candidate shape provided by the cloud service provider. Besides the availability of each of the candidate shapes, the shape selector may use other criteria for determining the launch shape. For example, each candidate shape may be weighted by the cloud services provider. The weighting may include a configurable float value or decimal (e.g., a number between 0 and 1). Each of the multiple shape may be weighted based on a number of factors. These factors may include a popularity of a given shape, a testing need of a given shape, a contractual obligation, and other suitable factors. Each of these factors may have a weight associated with it, and the overall weighting of the shape may be an average of the weights of the different factors. The weights may be determined, at least in part, by artificial intelligence and/or by a user input. In some embodiments, the weights may be determined on a per-user basis.

Once the launch shape is selected, at block 414, the cloud services provider 451 may merge information used to launch a compute instance. The information may include the launch shape, an image attribute, and other such information. In some embodiments, the launch request may not provide all of the information used to launch a compute instance. In merging the information, the cloud services provider 451 may then utilize one or more services to determine the other information used to launch a compute instance. One of these services may include an image selector. The image selector may determine an image to be loaded on the compute instance using one or more tags provided by the cloud services user. The image selector may also determine an image to be loaded based, at least in part, on the shape indicated in the launch request. Each image may be based on the same workload, configured to run on the specific architecture defined within the shape.

The validation may also include ensuring a compatibility between the launch shape and the other information. For example, the shape indicated may include an x86 architecture and an image attribute corresponding to software such as Oracle Linux 8. The validation may ensure that the latest version of the software is loaded and/or ensure compatibility between the indicated software and indicated shape.

After the information has been merged and validated, at block 410, the cloud services provider 451 may then launch the compute instance. Launching the compute instance may include steps 216-224 in FIG. 2. Thus, launching the compute instance may be performed by one or more services of the cloud services provider 451 such as the proxy service 254, the compute instance service 256, and other such services.

Figure 5:
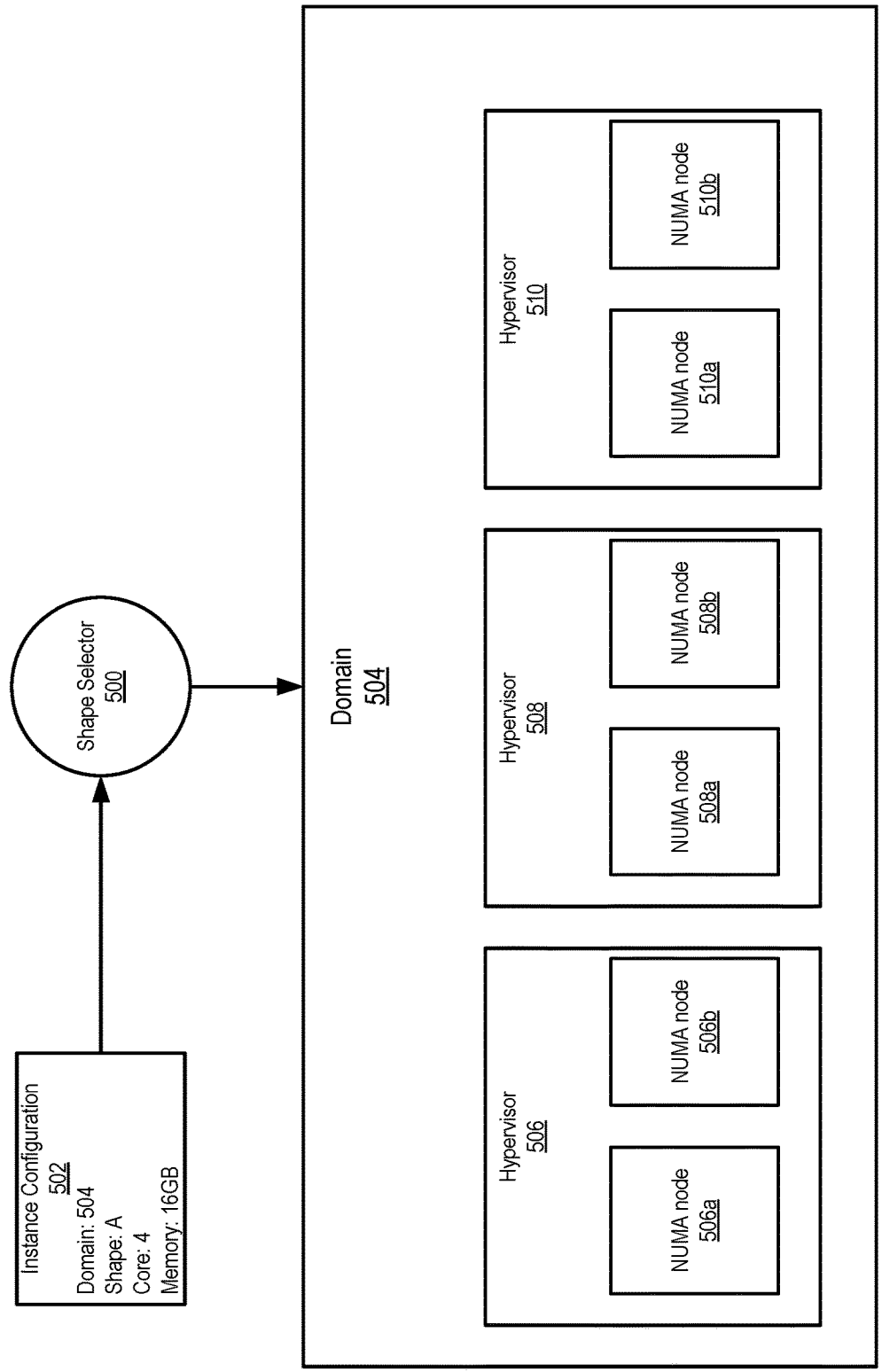
FIG. 5 illustrates a simplified diagram of a shape selector and a domain with several capacity objects, according to certain embodiments.

FIG. 5 illustrates a simplified diagram of a shape selector 500 and a domain 504 with several capacity objects, according to certain embodiments. The shape selector 500 may be similar to the shape selector service described in FIG. 2. As such, the shape selector 500 may be a service included in a compute instance service such as the compute instance service 256. The shape selector 500 may alternatively be a service outside of the compute instance service 256, accessible via an API call. The domain 504 may be an availability domain of the cloud services provider, where the domain 504 has a plurality of hypervisors 506-510. The plurality of hypervisors 506-510 may be further divided into NUMA nodes 506a-b-510a-b. Each of the NUMA nodes 506a-b-510a-b may include a plurality of processing cores ("cores") and be configured to launch and run one or more virtual machines. In some embodiments, each of the hypervisors 506-510 may support a certain shape and/or architecture (e.g., x86, ARM, etc.). In other embodiments, each of the hypervisors 506-510 may support multiple shapes and/or architectures. The domain 504 may be one of a plurality of availability domains hosted by the cloud services provider. The domain 504, the hypervisors 506-510, and the NUMA nodes 506a-b-510a-b may be used, at least in part, by a shape selector service to determine a launch shape for a compute instance (or pool of compute instances) requested by an cloud services user.

An instance configuration 502 may be received by the shape selector 500. The instance configuration 502 may be created via an API such as the API 302 in FIG. 3, and transmitted to the shape selector 500 via a proxy service such as the proxy service 254 in FIG. 2. The instance configuration 502 may include a launch request for a compute instance and indicate the domain 504, a shape A, a core requirement of four, and a memory requirement of 16 GB.

The shape selector 500 may then examine the domain 504 to determine which hypervisors may be used to launch the compute instance. To determine which of the hypervisors may be used, the shape selector 500 may determine a number of available cores in each of the NUMA nodes 506a-b-510a-b.

Figure 6:
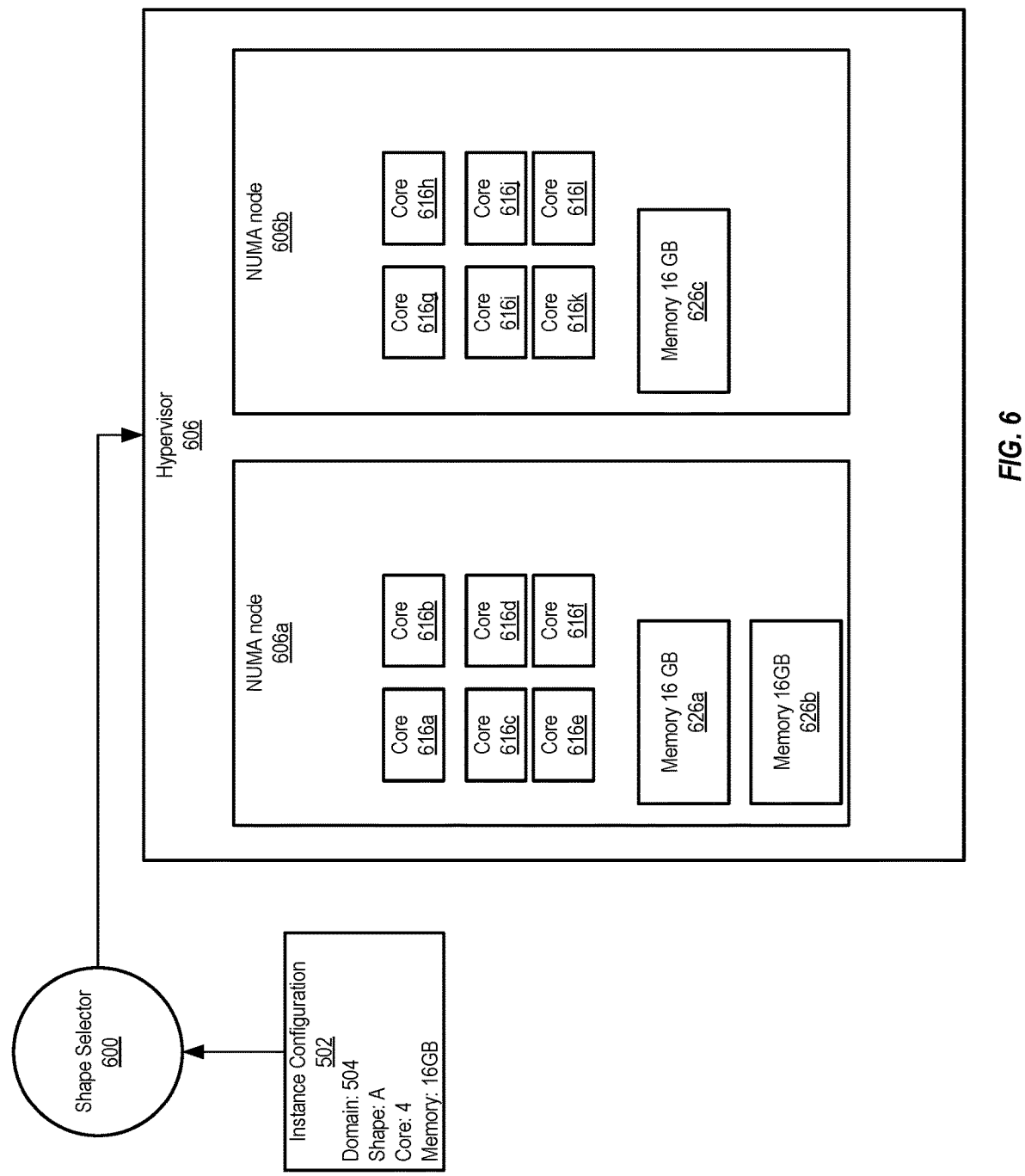
FIG. 6 illustrates a shape selector and a hypervisor, according to certain embodiments.

FIG. 6 illustrates a shape selector 600 and a hypervisor 606, according to certain embodiments. The shape selector 600 may be similar to the shape selector 500 in FIG. 5. Similarly, the hypervisor 606 may be similar to the hypervisor 506. The shape selector 600 may examine the hypervisor 606 in order to determine which hypervisor to use to launch a compute instance with the instance configuration 502 Although the shape selector 600 is illustrated examining just the hypervisor 606, the shape selector 600 may examine multiple hypervisors (e.g., the hypervisor 508-510 in FIG. 5).

The shape selector 600 may determine that the hypervisor 606 has NUMA nodes 606a-b capable of launching virtual machines with the shape A, as indicated by the instance configuration 502. The shape selector 600 may further determine that the NUMA node 606a has six available cores 616a-f and two available memory blocks 626a-b, each having 16 GB. The shape selector 600 may then determine that the NUMA node 606b has six available cores 616g-1, and one available memory block 626c. In determining the availability of the hypervisor 606 to launch the compute instance, the shape selector 600 may determine that the hypervisor 606 may support two instances of the compute instance.

In determining that the hypervisor 606 may support two instances of the compute instance, the shape selector 600 may account for fragmentation. For example, the hypervisor 606 may have a total of twelve available cores 616a-1, while the instance configuration 502 indicates that only four cores are desired. However, the twelve available cores 616a-l are distributed across the NUMA nodes 606a-b in two groups of six (e.g., the available cores 616a-f). The compute instance may not be launched and ran across NUMA nodes. In other words, each compute instance must be run on one NUMA node. Thus, only four of the six available cores 616a-f may be used to support the compute instance on NUMA node 606a. The other two available cores are considered fragmented and not counted towards the availability of the hypervisor 606. A similar determination may be made for the six available cores 616g-l on the NUMA node 606b.

The shape selector 600 may perform a similar determination on multiple hypervisors for the shape A. In some embodiments, multiple instance configurations may be received, each having different shapes. The shape selector 600 may then perform similar determinations across multiple hypervisors for each of the different shapes. In this way the shape selector 600 may determine which shape has the most availability across all available hypervisors. The shape selector 600 may then use availability of each shape to determine a launch shape for the compute instance.

The shape selector 600 may use other criteria for determining the launch shape. For example, each candidate shape may be weighted by the cloud services provider. The weighting may include a configurable float value or decimal (e.g., a number between 0 and 1). Each of the multiple supported shapes may be weighted based on a number of factors. These factors may include a popularity of a given shape, a testing need of a given shape, a contractual obligation, and other suitable factors. Each of these factors may have a weight associated with it, and the overall weighting of the shape may be an average of the weights of the different factors. The weights may be determined, at least in part, by artificial intelligence and/or by a user input. In some embodiments, the weights may be determined on a per-user basis.

Figure 7:
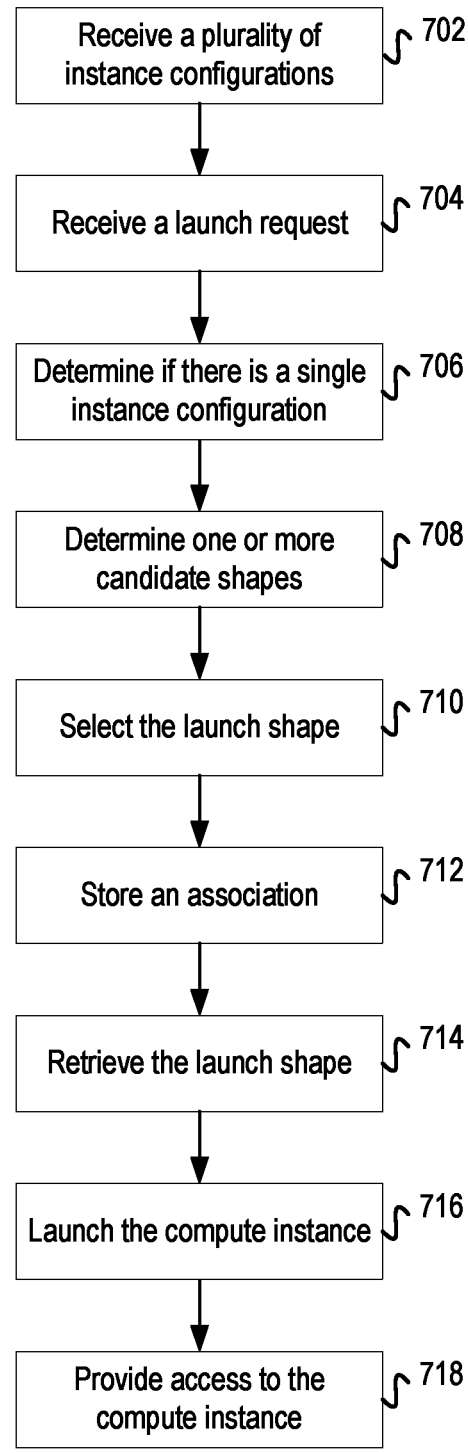
FIG. 7 illustrates a method for providing a compute instance to a client device, according to certain embodiments.

FIG. 7 illustrates a method 700 for providing a compute instance to a client device, according to certain embodiments. While the operations of methods 700 are described as being performed by a computing system, it should be understood that any suitable device may be used to perform one or more operations of these processes. The methods 700 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

The method 700 may be performed using some or all of the systems and processes disclosed herein. At step 702, the method 700 may include receiving, by a management service, a plurality of instance configurations. The plurality of instance configurations may be received from a client device, such as the computing device 112 in FIG. 1. The instance configurations may be generated using an instance configuration API, such as the API 302 in FIG. 3. The instance configurations may include information indicating one or more shapes, one or more images, a number of cores, one or more virtual network interface card (VNIC) details, one or more availability domains, and other such information that may be required to launch a compute instance. The management service may be hosted by a cloud services provider, such as the management service 201 in FIG. 2.

At step 704, the method 700 may include receiving, by the management service, information identifying a launch request for a compute instance. The launch request may be transmitted by the client device. The launch request may be similar to the launch request 114 in FIG. 1. In some embodiments, the launch request may include one or more instance configuration IDs, where the instance configuration IDs are used to reference instance configurations stored in an array. Additionally or alternatively, the instance configuration ID may reference an array of instance configurations stored by the cloud services provider. The launch request may also include the plurality of instance configurations from the step 702. In other embodiments, the launch request may include a single instance configuration or instance configuration ID.

In some embodiments, the instance configurations may include an image including an operating system compatible with the instruction set necessary to run on the architecture specified in each instance configuration. Each image may include the same workload, configured to run on a specific architecture. In some embodiments, the cloud services user may provide one or more images, each associated with a specific architecture (e.g., ARM, x86).

At step 706, the method 700 may include determining whether the launch request references a single instance configuration. If the launch request includes multiple instance configurations, an array of instance configurations, and/or references thereto, at step 708, the method 700 may include determining, by the management service, one or more candidate shapes for the compute instance. Determining the one or more candidate shapes may include verifying the instance configurations against one or more associated service limits and quotas. The verification may include checking a current usage of compute instances against the service limits and quotas, as is described in FIG. 2. If the launch includes a single instance configuration (or reference thereto), then the shape included in the single instance configuration may be the only candidate shape. The only candidate shape may then be verified against one or more associated service limits and/or quotas. The method 700 may then include selecting the one or more candidate shapes based, at least in part, on the single instance configuration.

The launch request may also include one or more image attributes that are used to select an image to be launched on the compute instance. An image selector may be used, in part, to select the image to be launched on the compute instance. In some embodiments, the candidate shapes may be determined based solely on the images provided. For example, a launch request may include and/or reference only one or more images without providing any other details. Each image may be based on the same workload, configured to run on a specific architecture and/or instruction set. The cloud services provider may then determine the candidate shapes based on the specific architectures required by each image.

In an embodiment, the management service may parse the launch request to count the number of instance configurations specified or referenced. Zero, one, or more instance configurations may be specified or referenced. In another embodiment, the launch request may accept a parameter indicating information related to instance configurations, wherein the parameter may be one of a pool of data types. A parameter of one data type may be configured to store a single instance configuration, such as the instance configuration 310a in FIG. 3. A parameter of a different data type may be configured to store multiple instance configurations, such as the instance configuration array 312 in FIG. 3. If zero instance configuration are specified or referenced, one or more prestored instance configurations may be selected by the cloud services provider. The one or more prestored instance configurations may be generated prior to the launch request by an API such as the instance configuration API 302 (using the compute instance function 304) in FIG. 3. The candidate shapes may then be those shapes indicated in the one or more prestored instance configurations.

At step 710, the method 700 may include selecting, by the management service, a launch shape for the compute instance. The launch shape may be selected from the one or more candidate shapes. To select the launch shape, the management service may utilize a shape selector service such as the shape selector 600 in FIG. 6. The shape selector service may determine an availability of one or more hypervisors to support the launch of the compute instance for a given shape. The shape selector may use the availability associated with each shape to determine the launch shape. The shape selector may also access one or more cloud subservices, provided by the cloud services provider, to determine an availability for each of the candidate shapes. The availability may include a total usage of compute instances associated with each candidate shape currently being provided by the cloud services provider to all cloud services users. The availability may also include a capacity associated with each of the candidate shapes, where the capacity is the total number of compute instances the cloud services provider is able to provide.

The shape selector service may use other criteria for determining the launch shape. For example, each candidate shape may be weighted by the cloud services provider. The weighting may include a configurable float value or decimal (e.g., a number between 0 and 1). Each of the multiple supported shapes may be weighted based on a number of factors. These factors may include a popularity of a given shape, a testing need of a given shape, a contractual obligation, and other suitable factors. Each of these factors may have a weight associated with it, and the overall weighting of the shape may be an average of the weights of the different factors. The weights may be determined at least in part by artificial intelligence and/or by a user input. In some embodiments, the weights may be determined on a per-user basis.

At step 712, the method 700 may further include storing an association between the launch shape and the information identifying the launch request. The association between the launch shape and the information identifying the launch request maybe stored on a data store such as the proxy data store and/or the data store 258. At step 712, the method 700 may further include accounting, by the management service, for a launch of the compute instance based at least in part on the launch shape. Accounting for the launch may include all or some of steps 212-214 in FIG. 2. In other words, the current usage by the cloud services user may be updated on a data store.

At step 714, the method 700 may include retrieving the launch shape based on the stored association between the launch shape and the information identifying the launch request. The management service may also access other information used to launch a compute instance. The other information may include an image attribute, a subnet, and other such information.

The management service may merge the other information with the launch shape. In merging the information, the management service may utilize one or more services to determine the other information used to launch the compute instance. One of these services may include an image selector. The image selector may determine an image to be loaded on the compute instance using one or more tags provided by the cloud services user. The image selector may also determine an image to be loaded based at least in part on the shape indicated in the launch request.

At step 716, the method 700 may include launching the compute instance by the management service. Launching the compute instance may at least in part be based on the launch shape retrieved from the data store. At step 718, the method 700 may include providing, by the management service, access to the compute instance to the client device.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
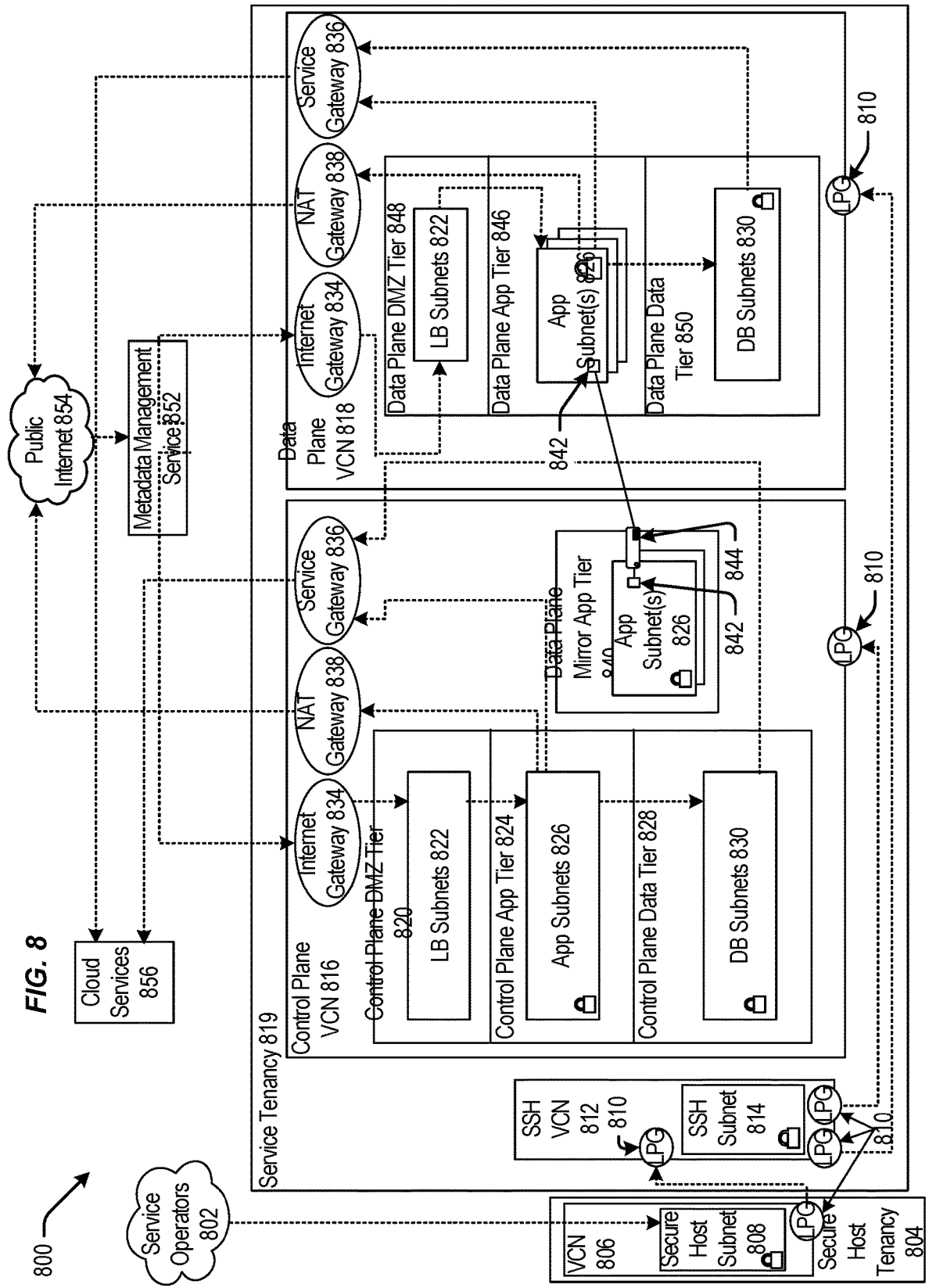
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
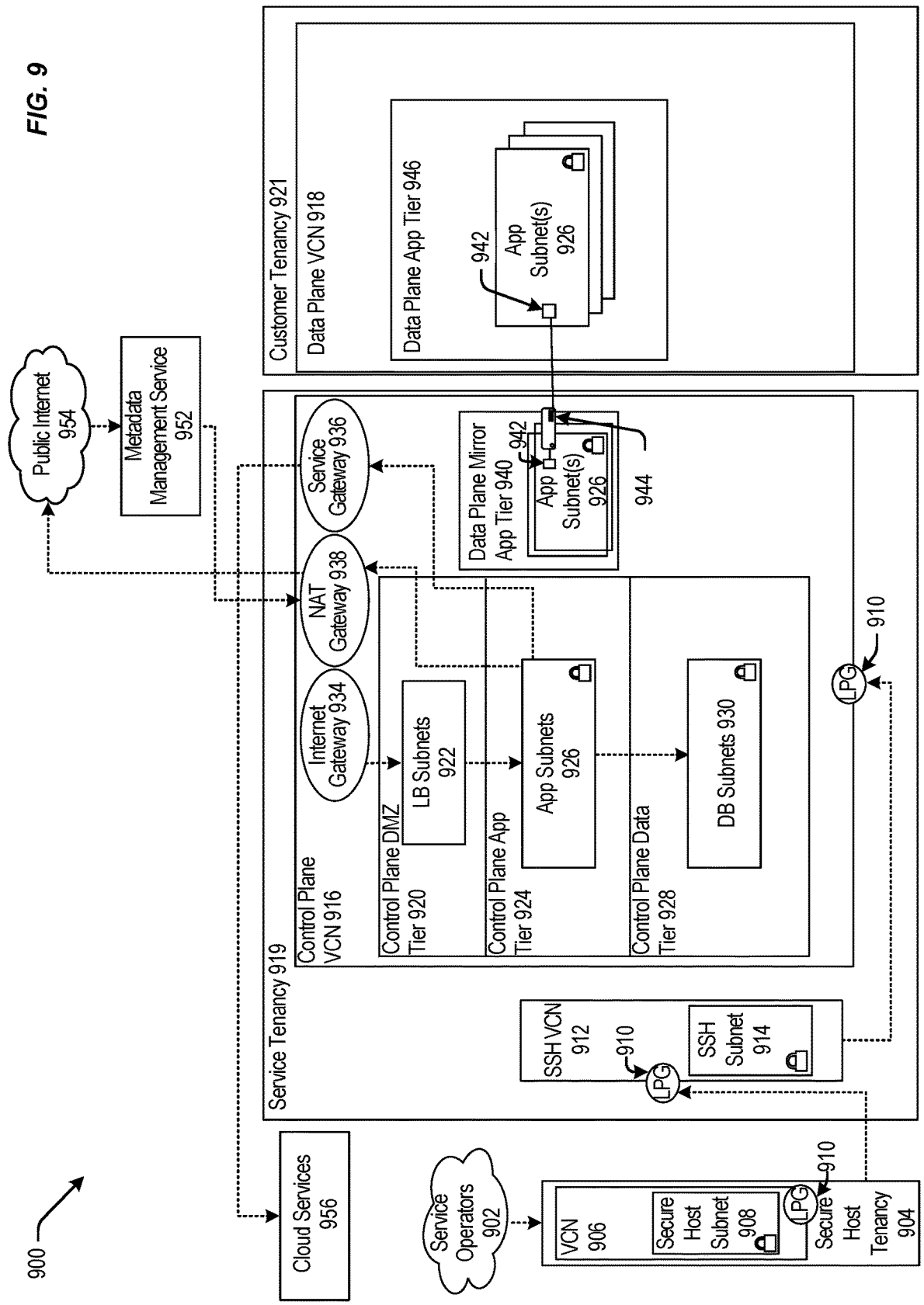
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
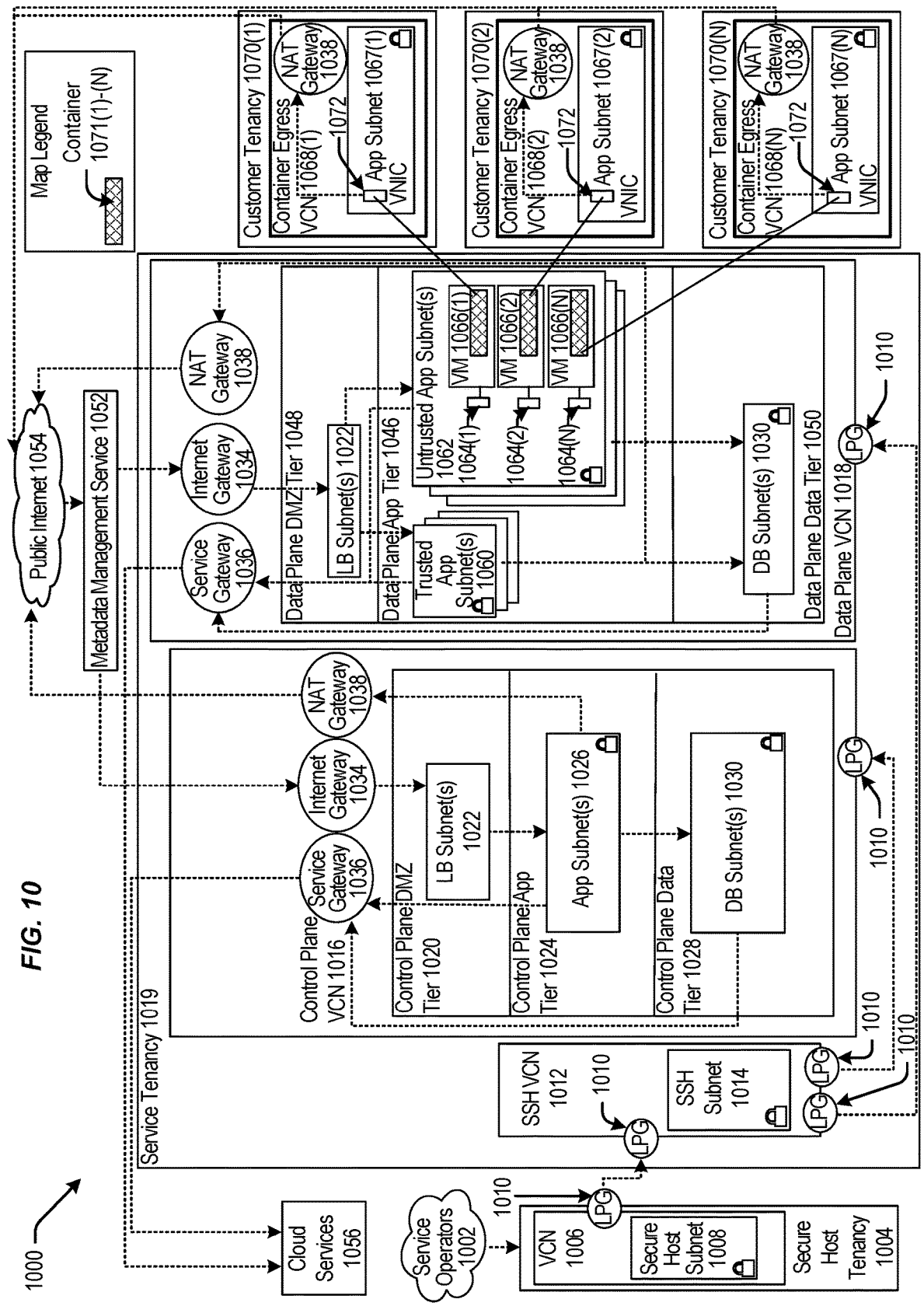
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
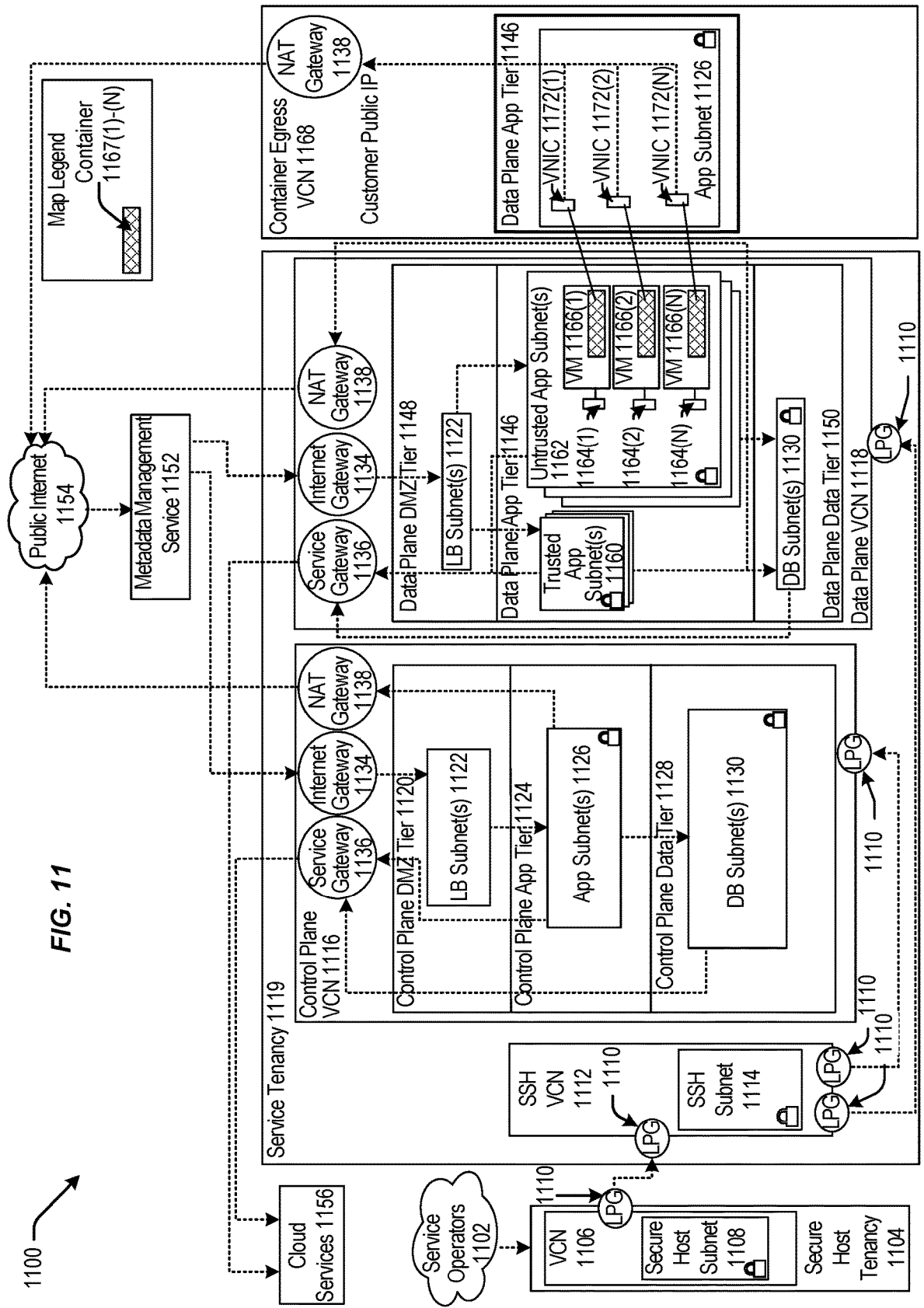
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
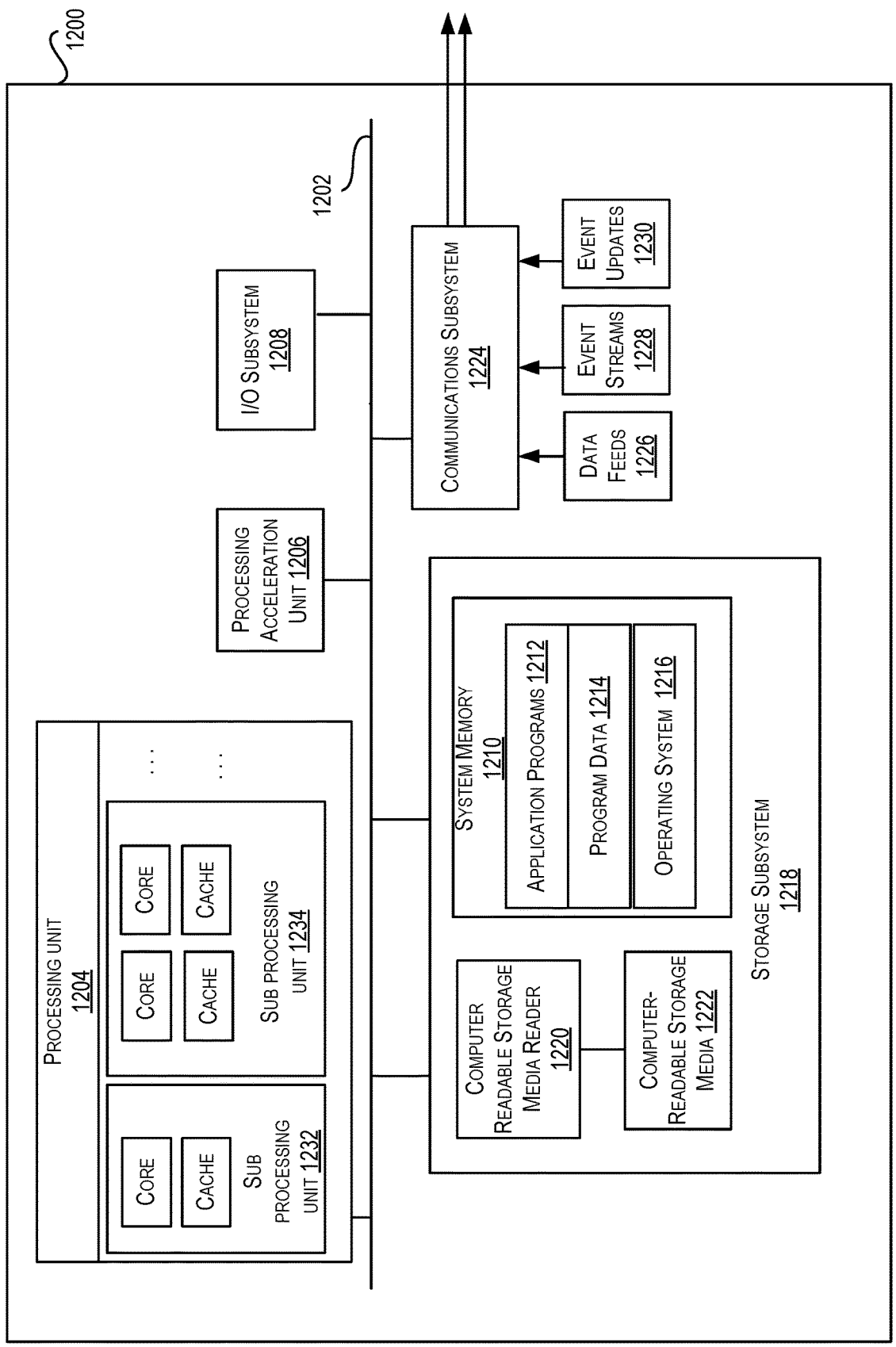
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a management service and from a client device, a plurality of instance configurations;
   receiving, by the management service and from the client device, information identifying a launch request for a compute instance, wherein the information identifying the launch request does not specify an instance configuration of the plurality of instance configurations or a specific configuration attribute;
   responsive to the launch request: determining, by the management service, one or more candidate shapes for the compute instance based at least in part on the plurality of instance configurations;
   selecting, by the management service and from the one or more candidate shapes, a launch shape for the compute instance;
   launching, by the management service, the compute instance using the launch shape; and
   providing, by the management service and to the client device, access to the compute instance, launched based, at least in part, on the launch shape.

2. The method of claim 1, further comprising:
   storing, by the management service and in a data store, an association between the launch shape and the information identifying the launch request;
   accounting, by the management service, for a launch of the compute instance based at least in part on the launch shape; and
   subsequent to accounting for the launch of the compute instance based on the launch shape:
   retrieving, by the management service and from the data store, the launch shape based on the stored association between the launch shape and the information identifying the launch request, wherein launching the compute instance using the launch shape is based on the launch shape retrieved from the data store.

3. The method of claim 2, wherein the information identifying the launch request is a launch identifier, the launch identifier stored by the management service for later use.

4. The method of claim 1, further comprising determining whether the launch request references a single instance configuration.

5. The method of claim 1, wherein the launch request comprises one or more image attributes based at least in part on the one or more candidate shapes and a workload, the image attributes used to select an image to be launched on the compute instance.

6. The method of claim 1, wherein selecting the launch shape is based, at least in part, on an availability associated with a shape.

7. The method of claim 6, wherein the availability associated with the shape comprises a total usage of compute instances associated with the shape, monitored by the management service.

8. The method of claim 6, wherein the availability associated with the shape comprises a fragmentation associated with the shape.

9. The method of claim 1, wherein the information identifying a launch request comprises a reference to an array, the array references the plurality of instance configurations, and the candidate shapes are determined based on the plurality of instance configurations.

10. The method of claim 1, wherein determining the one or more candidate shapes further comprises:
    accessing, by the management service, one or more prestored instance configurations associated with the client device and generated prior to receiving the launch request;
    determining, by the management service, one or more shapes indicated by each of the one or more prestored instance configurations; and
    selecting, by the management service, the one or more shapes indicated by each of the one or more prestored instance configurations as the one or more candidate shapes.

11. A system comprising:
    one or more processors;
    one or more non-transitory computer-readable media comprising instructions that, when executed by the one or more processors, cause the system to perform operations to:

receive, by a management service and from a client device, a plurality of instance configurations;

receive, by the management service and from the client device, information identifying a launch request for a compute instance, wherein the information identifying the launch request does not specify an instance configuration of the plurality of instance configurations or a specific configuration attribute;

responsive to the launch request: determine, by the management service, one or more candidate shapes for the compute instance based, at least in part, on the plurality of instance configurations;

select, by the management service and from the one or more candidate shapes, a launch shape for the compute instance;

launch, by the management service, the compute instance using the launch shape; and provide, by the management service and to the client device, access to the compute instance, launched based, at least in part, on the launch shape.

12. The system of claim 11, wherein the instructions further cause the system to perform operations to:

store, by the management service and in a data store, an association between the launch shape and the information identifying the launch request;

account, by the management service, for a launch of the compute instance based at least in part on the launch shape; and subsequent to accounting for the launch of the compute instance based on the launch shape: retrieve, by the management service and from the data store, the launch shape based on the stored association between the launch shape and the information identifying the launch request, wherein launching the compute instance using the launch shape is based on the launch shape retrieved from the data store.

13. The system of claim 12, wherein the information identifying the launch request is a launch identifier, the launch identifier stored by the management service for later use.

14. The system of claim 11, wherein the instructions further cause the system to perform operations to determine whether the launch request references a single instance.

15. The system of claim 14, wherein the launch request comprises one or more image attributes, the image attributes used to select an image to be launched on the compute instance.

16. One or more non-transitory computer-readable storage media storing a set of instructions that, when executed by one or more processors of a computer system, cause the computer system to perform operations comprising:

receiving, by a management service, and from a client device, a plurality of instance configurations;

receiving, by the management service and from the client device, information identifying a launch request for a compute instance, wherein the information identifying the launch request does not specify an instance configuration of the plurality of instance configurations or a specific configuration attribute;

responsive to the launch request: determining, by the management service, one or more candidate shapes for the compute instance based at least in part on the plurality of instance configurations;

selecting, by the management service and from the one or more candidate shapes, a launch shape for the compute instance;

launching, by the management service, the compute instance using the launch shape; and providing, by the management service and to the client device, access to the compute instance, launched based at least in part on the launch shape.

17. The one or more non-transitory computer-readable storage media of claim 16, wherein the instructions cause the system to perform operations further comprising:

storing, by the management service and in a data store, an association between the launch shape and the information identifying the launch request;

accounting, by the management service, for a launch of the compute instance based at least in part on the launch shape; and subsequent to accounting for the launch of the compute instance based on the launch shape:

retrieving, by the management service and from the data store, the launch shape based on the stored association between the launch shape and the information identifying the launch request, wherein launching the compute instance using the launch shape is based on the launch shape retrieved from the data store.

18. The one or more non-transitory computer-readable storage media of claim 17, wherein the information identifying the launch request is a launch identifier, the launch identifier stored by the management service for later use.

19. The one or more non-transitory computer-readable storage media of claim 16, wherein the plurality of instance configurations comprise at least one of an architecture or a number of cores.

20. The one or more non-transitory computer-readable storage media of claim 16, wherein selecting the launch shape is based, at least in part, on an availability of a shape.

* * * * *